(12) United States Patent
Shaw et al.

(10) Patent No.: US 9,307,439 B2
(45) Date of Patent: *Apr. 5, 2016

(54) LONG TERM EVOLUTION MOBILITY NETWORK TIMER AND RETRY MANAGEMENT

(71) Applicant: AT&T Intellectual Property I, L.P., Atlanta, GA (US)

(72) Inventors: Venson M. Shaw, Kirkland, WA (US); Guangtian Liu, Austin, TX (US); Eric Noel, Holmdel, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/540,317

(22) Filed: Nov. 13, 2014

(65) Prior Publication Data

US 2015/0072691 A1    Mar. 12, 2015

Related U.S. Application Data

(63) Continuation of application No. 13/712,407, filed on Dec. 12, 2012, now Pat. No. 8,929,899.

(51) Int. Cl.
| | |
|---|---|
| *H04W 28/02* | (2009.01) |
| *H04W 76/02* | (2009.01) |
| *H04L 12/825* | (2013.01) |
| *H04L 12/841* | (2013.01) |
| *H04W 36/22* | (2009.01) |
| *H04W 88/02* | (2009.01) |

(52) U.S. Cl.
CPC ........... *H04W 28/0226* (2013.01); *H04L 47/26* (2013.01); *H04L 47/283* (2013.01); *H04W 28/0289* (2013.01); *H04W 36/22* (2013.01); *H04W 76/027* (2013.01); *H04W 88/02* (2013.01)

(58) Field of Classification Search
CPC ............ H04W 28/0226; H04W 36/22; H04W 76/027; H04W 28/0289; H04W 88/02; H04L 47/283; H04L 47/26
USPC ........................... 455/445, 450–452.2, 435.2
See application file for complete search history.

(56) References Cited

U.S. PATENT DOCUMENTS

| | | |
|---|---|---|
| 7,715,868 B2 | 5/2010 | Zhao et al. |
| 8,406,744 B2 | 3/2013 | Shaw et al. |
| 8,406,759 B2 | 3/2013 | Ryan et al. |
| 8,428,610 B2 | 4/2013 | Chowdhury et al. |
| 8,463,259 B2 | 6/2013 | Sokondar et al. |
| 8,520,633 B2 | 8/2013 | Liu et al. |
| 8,644,823 B2 | 2/2014 | Rozinov |
| 8,682,322 B2 | 3/2014 | Wallis et al. |
| 8,682,327 B2 | 3/2014 | Tenny et al. |
| 8,694,003 B2 | 4/2014 | Huang et al. |

(Continued)

*Primary Examiner* — Sharad Rampuria
(74) *Attorney, Agent, or Firm* — Baker & Hostetler LLP

(57) ABSTRACT

Management of a network may be accomplished by adjusting timer settings and/or retry criteria. For example, communications and management from an end-to-end perspective of entities in a network may be conducted; timers and/or retry criteria may be adjusted dynamically based on network traffic load; timers and/or retry criteria may be adjusted dynamically based on overload conditions; feedback mechanisms may be implemented to allow downstream network elements to inform upstream network elements about the health status and/or load condition of the network; and/or differentiated timer and retry criteria/mechanisms may be implemented.

20 Claims, 12 Drawing Sheets

(56) References Cited

U.S. PATENT DOCUMENTS

| | | |
|---|---|---|
| 8,773,988 B2 | 7/2014 | Tiwari |
| 8,818,381 B2 | 8/2014 | Van Phan et al. |
| 8,831,611 B2 | 9/2014 | Koo et al. |
| 2005/0265382 A1 | 12/2005 | Hartikainen |
| 2011/0134815 A1 | 6/2011 | Gunaratnam et al. |
| 2012/0178449 A1* | 7/2012 | Liao ............... H04W 60/00 455/435.2 |
| 2013/0051326 A1 | 2/2013 | Jeyatharan et al. |
| 2013/0155954 A1 | 6/2013 | Wang et al. |
| 2013/0286853 A1 | 10/2013 | Shi et al. |
| 2014/0092733 A1 | 4/2014 | Johansson et al. |
| 2015/0117184 A1* | 4/2015 | Youtz ............... H04W 76/027 370/230 |
| 2015/0173119 A1* | 6/2015 | Wirtanen ........... H04W 48/06 455/452.1 |

\* cited by examiner

LONG TERM EVOLUTION MOBILITY NETWORK TIMER AND RETRY MANAGEMENT

CROSS-REFERENCE TO RELATED APPLICATIONS

The instant application is a continuation of, and claims priority to, U.S. patent application Ser. No. 13/712,407, filed Dec. 12, 2012. U.S. patent application Ser. No. 13/712,407 is incorporated by reference herein in its entirety.

TECHNICAL FIELD

The technical field generally relates to wireless communications and more specifically relates to network timers and retry management in a long term evolution (LTE) network.

BACKGROUND

When a problem arises with a communications device, such as a mobile phone or the like, attempting to connect and/or transmit to a network, the mobile phone may retry to connect and/or transmit. These retried attempts could occur several times causing network congestions.

SUMMARY

Management of a long term evolution (LTE) mobility network may be accomplished by adjusting timer settings and/or retry criteria/mechanisms. For example, communications and management from an end-to-end perspective of entities in a network may be conducted. Timers and/or retry criteria/mechanisms may be adjusted dynamically based on network traffic load. Timers and/or retry criteria/mechanisms may be adjusted dynamically based on overload conditions. Feedback mechanisms may allow downstream network elements (e.g., home subscriber server, HSS) to communicate with upstream network elements (e.g., Diameter Routing Agent, DRA,) to inform upstream network elements about the health status and/or load condition of the network in order to allow the upstream network elements to adjust respective timers and retry mechanism accordingly. Differentiated timer and retry criteria/mechanisms may be implemented when a single network element communicates with multiple downstream network elements to allow for flexibility based on individual downstream network traffic and health condition.

BRIEF DESCRIPTION OF THE DRAWINGS

Reference is made here to the accompanying drawings, which are not necessarily drawn to scale.

DETAILED DESCRIPTION OF ILLUSTRATIVE EMBODIMENTS

Aspects of the instant disclosure are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

Figure 1:
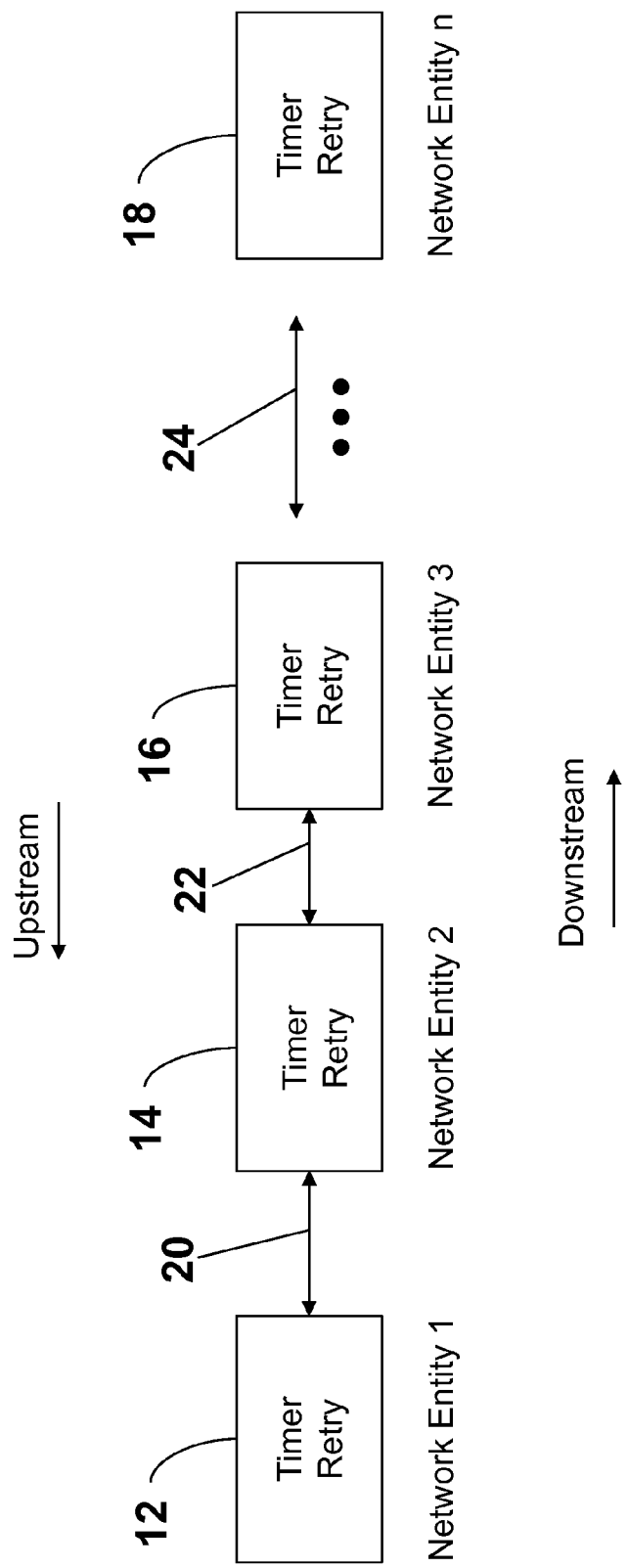
FIG. 1 is a diagram of an example system and process for management of timer settings and/or retry criteria/mechanisms.

FIG. 1 is a diagram of an example system and process for management of timer settings and/or retry criteria/mechanisms. As depicted in FIG. 1, a network may comprise multiple network entities as depicted by network entity 12, network entity 14, network entity 16, and network entity 18. Each network entity may have a timer associated therewith. Each network entity may have retry criteria associated therewith. In order to manage the network more efficiently and reduce the time to establish communications between network entities, various timer setting adjustments and/or retry criteria/mechanisms are described. It is to be understood that the network depicted in FIG. 1 is an example, and should not be interpreted as limiting in structure, function, or the like.

In an example embodiment, end to end timer management of a network may be implemented wherein a network entity in a network may a have greater timeout value than its next lower level downstream network entity. This may reduce the time it takes to establish communications between networks entities and manage the network more efficiently. When a network entity attempts to establish communication with another network entity (depicted by steps 20, 22, 24), if the attempt fails, the network entity may wait a period of time before retrying establishing communication with the other network entity. Thus, to avoid upstream elements sending retransmissions while downstream elements are still handling the initial request, and to ensure timeout propagates from downstream to upstream, timer values may be decreased as the network is traversed downstream. For example network entity 12 may have a timer value that is greater than the timer value for network entity 14. Network entity 14 may have a timer value that is greater than the timer value for network entity 16. And network entity 16 may have a timer value that is greater than the timer value for network entity 18. If a network entity existed (not depicted in FIG. 1) downstream of network entity 18, network entity 18 may have a timer value that is greater than the timer value for that next downstream network entity 18.

In an example embodiment, end to end retry management of a network may be implemented wherein a network entity in the network may have a greater maximum number of retries than the next lower level downstream network entity. This may reduce the time it takes to establish communications between networks entities and manage the network more efficiently. When a network entity attempts to establish communication (depicted by steps 20, 22, 24) with a downstream network entity, if the attempt fails, the network entity may retry establishing communication with the downstream network. Accordingly, in an example embodiment, an upstream network entity may have a greater maximum number of retries than its next downstream network entity. For example network entity 12 may have a maximum number of retries that is greater than the maximum number of retries for network entity 14. Network entity 14 may have a maximum number of retries that is greater than the maximum number of retries for network entity 16. And network entity 16 may have a maximum number of retries that is greater than the maximum number of retries for network entity 18.

In an example embodiment, end to end congestion feedback within a network may be implemented wherein a downstream network entity may inform an upstream network entity about the health status and/or load condition of the network and/or the network entity. A downstream network entity may feedback a congestion indicator, or the like, which may include current status, historical information, future congestion levels, etc., to upstream network entities. This may allow upstream network entities to adjust respective timers and retry mechanism accordingly. For example, network entity 18 may determine, via any appropriate process, mechanism, or the like, the amount of data traffic (data) it is processing, the amount of data it expects to process (e.g., via a prediction mechanism, via scheduled events, etc.), whether the amount of data it is processing is over a threshold amount (e.g., congestion), whether the amount of data it is processing is expected to go over a threshold amount (e.g., via prediction mechanism to determine predicted congestion, via scheduled events to determine anticipated congestion, etc.), the amount of memory it is utilizing, the amount of memory it expects to utilize (e.g., via a prediction mechanism, via scheduled events, etc.), whether the amount of memory it is utilizing is over a threshold amount (e.g., congestion), whether the amount of memory it is utilizing is expected to go over a threshold amount (e.g., via prediction mechanism to determine predicted congestion, via scheduled events to determine anticipated congestion, etc.), historical information regarding processing, historical information regarding memory, or any appropriate combination thereof. And the network entity 18 may provide any or all of the aforementioned information to network entity 16. Network entity 16 may provide the information received from network entity 18 to network entity 14. Network entity 16 may also provide to network entity 14 any information that network entity 16 determines about itself, such as, for example, information regarding processing and/or memory as describe above in this paragraph. Similarly, network 14 may provide to network entity 12, information received from network entity 16 (which may include information pertaining to network entity 18, may include information pertaining to network entity 16, or any appropriate combination thereof). And network entity 14 may also provide to network entity 12 any information that network entity 14 determines about itself, such as, for example, information regarding processing and/or memory as describe above in this paragraph.

Figure 2:
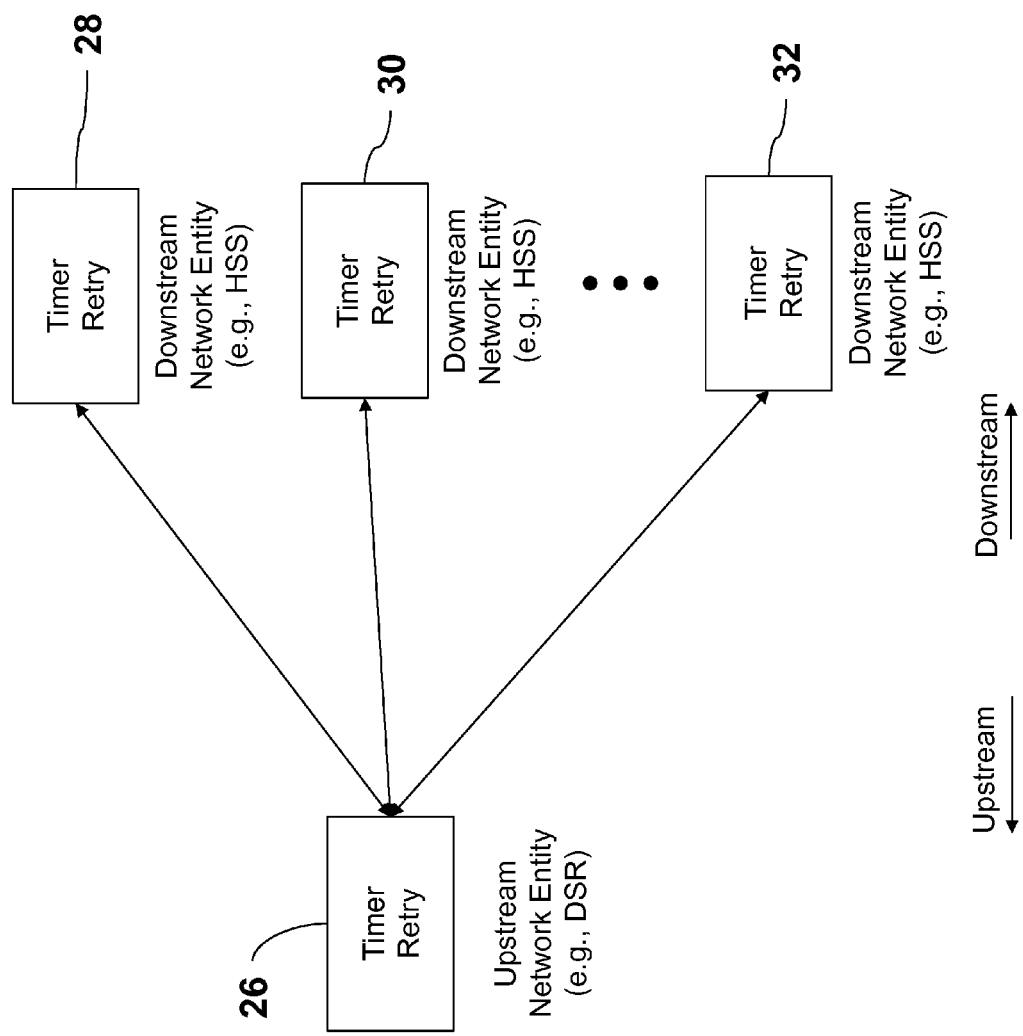
FIG. 2 is another diagram of an example system and process for management timer settings and/or retry criteria/mechanisms.

FIG. 2 is another diagram of an example system and process for management timer settings and/or retry criteria/mechanisms. In an example embodiment, end to end differentiated timer and retry criteria/mechanisms may be implemented wherein, when a single network entity communicates with multiple downstream network entities, the respective timer value and/or retry criteria for each of the multiple downstream network entities may be based on a respective condition of each downstream network entity. For example, referring to FIG. 2, network entity 26 may determine the timer value and/or retry criteria for each of network entity 28, network entity 30, and network entity 32. The determined timer values and/or retry criteria may be based on a condition of each of network entity 28, network entity 30, and network entity 32. Thus, each of network entity 28, network entity 30, and network entity 32 may have its own tailored timer value and/or retry criteria. The condition may be based on processing and memory usage of each of network entity 28, network entity 30, and network entity 32. For example, network entity 28 may determine, via any appropriate process, mechanism, or the like, the amount of data traffic (data) it is processing, the amount of data it expects to process (e.g., via a prediction mechanism, via scheduled events, etc.), whether the amount of data it is processing is over a threshold amount (e.g., congestion), whether the amount of data it is processing is expected to go over a threshold amount (e.g., via prediction mechanism to determine predicted congestion, via scheduled events to determine anticipated congestion, etc.), the amount of memory it is utilizing, the amount of memory it expects to utilize (e.g., via a prediction mechanism, via scheduled events, etc.), whether the amount of memory it is utilizing is over a threshold amount (e.g., congestion), whether the amount of memory it is utilizing is expected to go over a threshold amount (e.g., via prediction mechanism to determine predicted congestion, via scheduled events to determine anticipated congestion, etc.), historical information regarding processing, historical information regarding memory, or any appropriate combination thereof. This information may be provided to network entity 26, and network entity 26 may determine a timer value and/or retry criteria (e.g., maximum number of retries) based on the information. Similarly, each of network entity 30 and network entity 32 may determine respective processing and memory usage as described above, and provide this information to network entity 26. Network entity 26 may determine a timer value and/or retry criteria for network entity 30 based on information received from network entity 30. And network entity 26 may determine a timer value and/or retry criteria for network entity 32 based on information received from network entity 32.

Network entities depicted in FIG. 2 may comprise any appropriate network entity. For example, network entity 26 may comprise a DSR and each of network entity 28, network entity 30, and network entity 32 may comprise a HSS.

Figure 3:
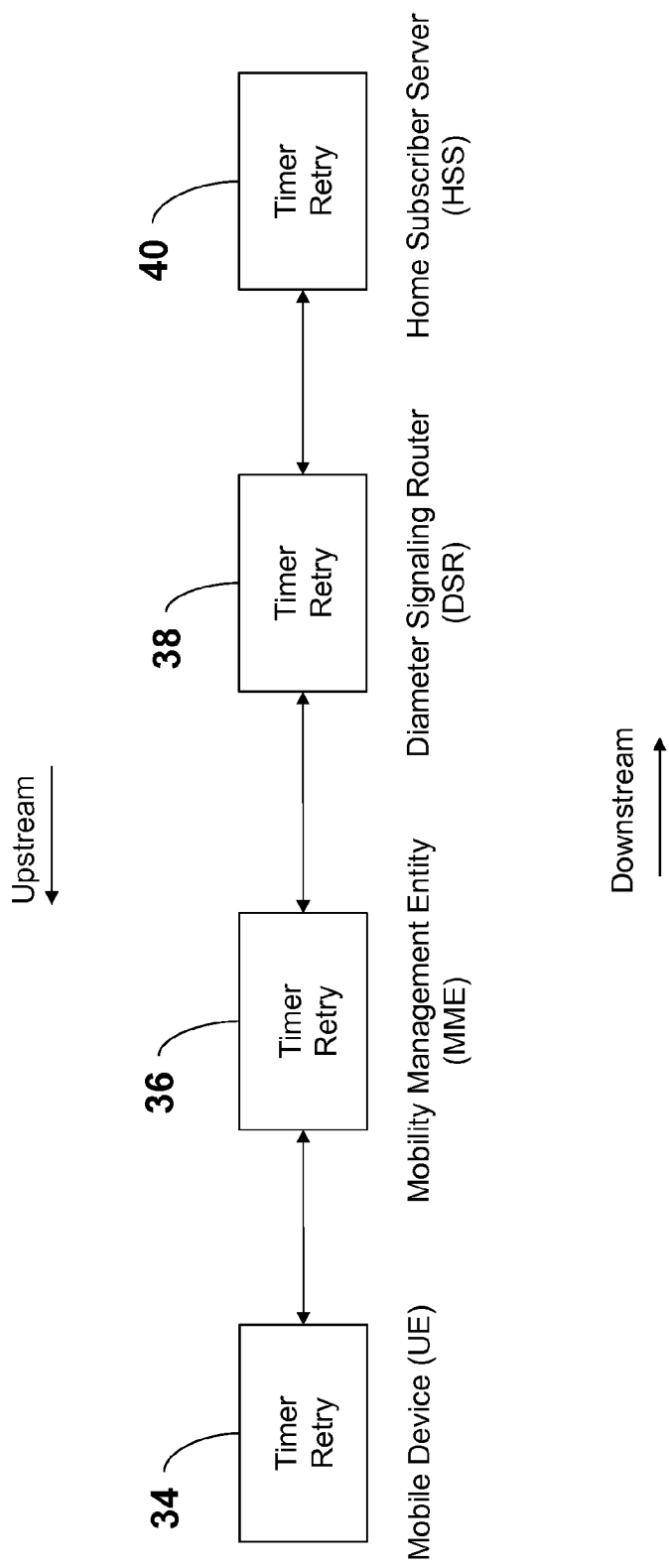
FIG. 3 is another diagram of an example system and process for management of timer settings and/or retry criteria/mechanisms.

FIG. 3 is a diagram of an example system and process for management of timer settings and/or retry criteria/mechanisms, wherein the network entities comprise a mobile device (also referred to as user equipment or UE) 34, a mobility management entity (MME) 36, a Diameter signaling router (DSR) 38, and a home subscriber server (HSS) 40. As depicted in FIG. 1, a network may comprise multiple network entities as depicted by network entity 12, network entity 14, network entity 16, and network entity 18. Each network entity may have a timer associated therewith. Each network entity may have retry criteria associated therewith. In order to manage the network more efficiently and reduce the time to establish communications between network entities, various timer setting adjustments and/or retry criteria/mechanisms are described. It is to be understood that the network depicted in FIG. 3 is an example, and should not be interpreted as limiting in structure, function, or the like.

In an example embodiment, end to end timer management of a network may be implemented wherein a network entity in a network may a have greater timeout value than its next lower level downstream network entity. This may reduce the time it takes to establish communications between networks entities and manage the network more efficiently. For example, the UE 34 may establish a timer (e.g., T3410 timeout) having a value of 15 seconds, for a UE attach request. The MME may establish a timer (e.g., Diameter timeout) having a value of 10 seconds. The DSR may establish a timer (e.g., Diameter Routing Agent, DRA-DSR set up pending transaction timeout) having a value of 8 seconds. The HSS may establish a timer (e.g., Diameter session timer) having a value of 6 seconds. And the HSS may establish a timer of 3 seconds.

In an example embodiment, end to end retry management of a network may be implemented wherein a network entity in the network may have a greater maximum number of retries than the next lower level downstream network entity. This may reduce the time it takes to establish communications between networks entities and manage the network more efficiently. For example, the UE 34 may establish a timer (e.g., T3410 retry) having a maximum number of retries of 12, for a UE attach request. The MME may establish a maximum number of retries (e.g., MME Diameter retry) of 9. The DSR may establish a maximum number of retries (e.g., DRA-DSR pending transaction retry) of 6. The HSS may establish a maximum number of retries (e.g., Diameter session retry) of 4. And the HSS may establish a maximum number of retries of 2.

In an example embodiment, end to end congestion feedback within a network may be implemented wherein a downstream network entity may inform an upstream network entity about the health status and/or load condition of the network and/or the network entity. A downstream network entity may feedback a congestion indicator, or the like, which may include current status, historical information, future congestion levels, etc., to upstream network entities. This may allow upstream network entities to adjust respective timers and retry mechanism accordingly. For example, HSS 40 may determine, via any appropriate process, mechanism, or the like, the amount of data traffic (data) it is processing, the amount of data it expects to process (e.g., via a prediction mechanism, via scheduled events, etc.), whether the amount of data it is processing is over a threshold amount (e.g., congestion), whether the amount of data it is processing is expected to go over a threshold amount (e.g., via prediction mechanism to determine predicted congestion, via scheduled events to determine anticipated congestion, etc.), the amount of memory it is utilizing, the amount of memory it expects to utilize (e.g., via a prediction mechanism, via scheduled events, etc.), whether the amount of memory it is utilizing is over a threshold amount (e.g., congestion), whether the amount of memory it is utilizing is expected to go over a threshold amount (e.g., via prediction mechanism to determine predicted congestion, via scheduled events to determine anticipated congestion, etc.), historical information regarding processing, historical information regarding memory, or any appropriate combination thereof. And HSS 40 may provide any or all of the aforementioned information to DSR 38. DSR 38 may provide the information received from HSS 40 to MME 36. DSR 38 may also provide to MME 36 any information that DSR 38 determines about itself, such as, for example, information regarding processing and/or memory as describe above in this paragraph. Similarly, MME 36 may provide to UE 34, information received from DSR 38 (which may include information pertaining to HSS 40, may include information pertaining to DSR 38, or any appropriate combination thereof). And MME 36 may also provide to UE 34 any information that MME 36 determines about itself, such as, for example, information regarding processing and/or memory as describe above in this paragraph.

Figure 4:
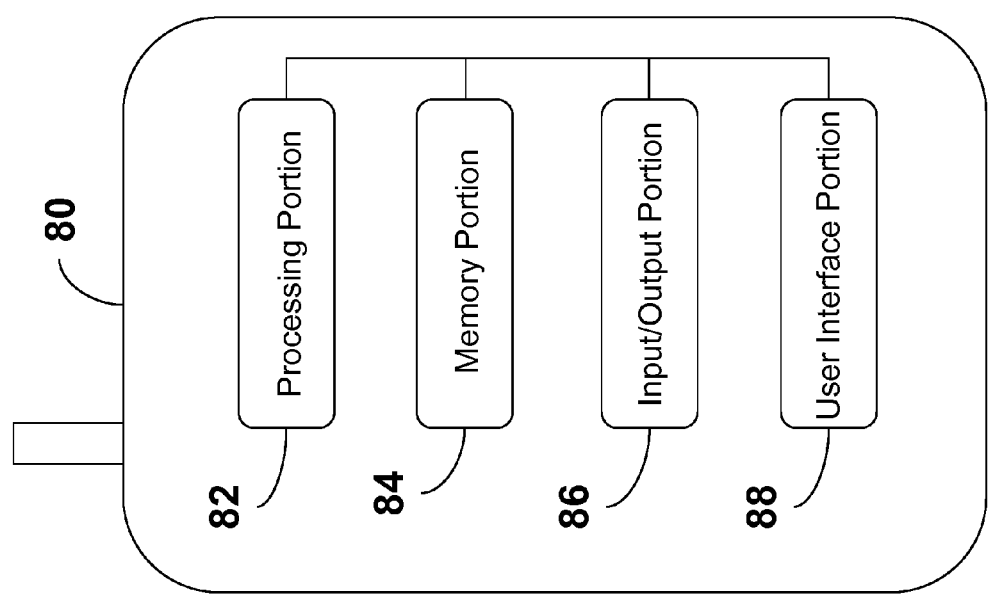
FIG. 4 is a block diagram of an example communications device that may be utilized to manage timer settings and/or retry criteria/mechanisms.

FIG. 4 is a block diagram of an example communications device 80 that may be utilized to manage timer settings and/or retry criteria/mechanisms. In an example embodiment, the communications device 80 may comprise the mobile device (UE) 12, 26. In an example configuration, communications device 80 comprises a mobile wireless device. The communications device 80, however, may comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The communications device 80 can include devices that are not typically thought of as portable, such as, for example, a public computing device, a navigation device installed in-vehicle, a set top box, or the like. The mobile communications device 80 can include non-conventional computing devices, such as, for example, a kitchen appliance, a motor vehicle control (e.g., steering wheel), etc., or the like. As evident from the herein description a communications device, a mobile device, or any portion thereof is not to be construed as software per se.

The communications device 80 may include any appropriate device, mechanism, software, and/or hardware for facilitating management of timer settings and/or retry criteria/mechanisms as described herein. In an example embodiment, the ability to facilitate management of timer settings and/or retry criteria/mechanisms is a feature of the communications device 80 that can be turned on and off Thus, in an example embodiment, an owner of the communications device 80 may opt-in or opt-out of this capability.

In an example embodiment, the communications device 80 comprises a processor and memory coupled to the processor. The memory may comprise executable instructions that when executed by the processor cause the processor to effectuate operations associated with managing timer settings and/or retry criteria/mechanisms.

In an example configuration, the communications device 80 comprises a processing portion 82, a memory portion 84, an input/output portion 86, and a user interface (UI) portion 88. Each portion of the communications device 80 comprises circuitry for performing functions associated with each respective portion. Thus, each portion can comprise hardware, or a combination of hardware and software. Accordingly, each portion of the communications device 80 is not to be construed as software per se. It is emphasized that the block diagram depiction of communications device 80 is exemplary and not intended to imply a specific implementation and/or configuration. For example, in an example configuration, the communications device 80 may comprise a cellular phone and the processing portion 82 and/or the memory portion 84 may be implemented, in part or in total, on a subscriber identity module (SIM) of the mobile communications device 80. In another example configuration, the communications device 80 may comprise a laptop computer. The laptop computer can include a SIM, and various portions of the processing portion 82 and/or the memory portion 84 can be implemented on the SIM, on the laptop other than the SIM, or any combination thereof.

The processing portion 82, memory portion 84, and input/output portion 86 are coupled together to allow communications therebetween. In various embodiments, the input/output portion 86 comprises a receiver of the communications device 80, a transmitter of the communications device 80, or a combination thereof. The input/output portion 86 is capable of receiving and/or providing information pertaining to management of timer settings and/or retry criteria/mechanisms as described herein. In various configurations, the input/output portion 86 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 82 may be capable of performing functions pertaining to management of timer settings and/or retry criteria/mechanisms as described herein. In a basic configuration, the communications device 80 may include at least one memory portion 84. The memory portion 84 may comprise a storage medium having a tangible physical structure. Thus, the memory portion 84, as well as any computer-readable storage medium described herein, is not to be construed as a transient signal per se. Further, the memory portion 84, as well as any computer-readable storage medium described herein, is not to be construed as a propagating signal per se. The memory portion 84 may store any information utilized in conjunction with management of timer settings and/or retry criteria/mechanisms as described herein. Depending upon the exact configuration and type of processor, the memory portion 84 may be volatile (such as some types of RAM), non-volatile (such as ROM, flash memory, etc.), or a combination thereof. The mobile communications device 80 may include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 80.

The communications device 80 also may contain a user interface (UI) portion 88 allowing a user to communicate with the communications device 80. The UI portion 88 may be capable of rendering any information utilized in conjunction with management of timer settings and/or retry criteria/mechanisms as described herein. The UI portion 88 may provide the ability to control the communications device 80, via, for example, buttons, soft keys, voice actuated controls, a touch screen, movement of the mobile communications device 80, visual cues (e.g., moving a hand in front of a camera on the mobile communications device 80), or the like. The UI portion 88 may provide visual information (e.g., via a display), audio information (e.g., via speaker), mechanically (e.g., via a vibrating mechanism), or a combination thereof. In various configurations, the UI portion 88 may comprise a display, a touch screen, a keyboard, an accelerometer, a motion detector, a speaker, a microphone, a camera, a tilt sensor, or any combination thereof. The UI portion 88 may comprise means for inputting biometric information, such as, for example, fingerprint information, retinal information, voice information, and/or facial characteristic information.

The UI portion 88 may include a display for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the UI portion may comprise a user interface (UI) application. The UI application may interface with a client or operating system (OS) to, for example, facilitate user interaction with device functionality and data. The UI application may aid a user in entering message content, viewing received messages, answering/initiating calls, entering/deleting data, entering and setting user IDs and passwords, configuring settings, manipulating content and/or settings, interacting with other applications, or the like, and may aid the user in inputting selections associated with management of timer settings and/or retry criteria/mechanisms as described herein.

Figure 5:
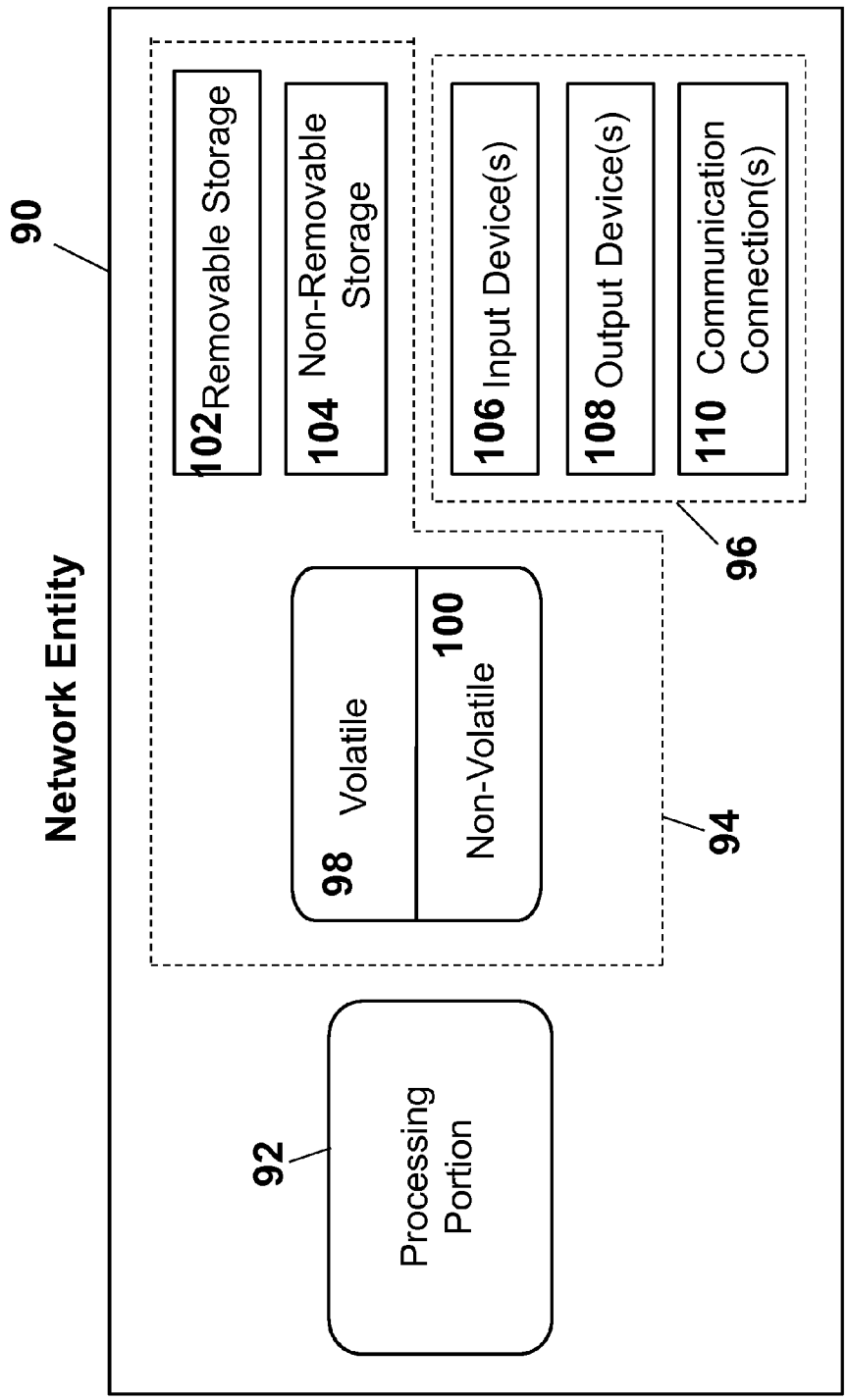
FIG. 5 is a block diagram of an example network entity 90 that may be utilized to manage timer settings and/or retry criteria/mechanisms.

FIG. 5 is a block diagram of an example network entity 90 that may be utilized to manage timer settings and/or retry criteria/mechanisms. The network entity 90 may comprise hardware or a combination of hardware and software. When used in conjunction with a network, the functionality needed to facilitate management of timer settings and/or retry criteria/mechanisms can reside in any one or combination of network entities. The network entity 90 depicted in FIG. 5 represents any appropriate network entity, or combination of network entities, such as, for example, a processor, a server, a gateway, a node, any appropriate entity depicted in FIG. 1, any appropriate entity depicted in FIG. 2, any appropriate entity depicted in FIG. 3, any appropriate entity depicted in FIG. 6 through FIG. 12, or any appropriate combination thereof. In an example configuration, the network entity 90 may comprise a component or various components of a cellular broadcast system wireless network. It is emphasized that the block diagram depicted in FIG. 5 is exemplary and not intended to imply a specific implementation or configuration. Thus, the network entity 90 may be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example embodiment, the network entity 90 may comprise a processor and memory coupled to the processor. The memory may comprise executable instructions that when executed by the processor cause the processor to effectuate operations associated with management of timer settings and/or retry criteria/mechanisms. As evident from the herein description a network entity or any portion thereof is not to be construed as software per se.

In an example configuration, the network entity 90 may comprise a processing portion 92, a memory portion 94, and an input/output portion 96. The processing portion 92, memory portion 94, and input/output portion 96 may be coupled together (coupling not shown in FIG. 5) to allow communications therebetween. The input/output portion 96 may be capable of receiving and/or providing information from/to a communications device and/or other network entities configured to be utilized with management of timer settings and/or retry criteria/mechanisms. For example, the input/output portion 96 may include a wireless communications (e.g., 2.5G/3G/4G/GPS) card. The input/output portion 96 may be capable of receiving and/or sending video information, audio information, control information, image information, data, or any combination thereof. In an example embodiment, the input/output portion 36 may be capable of receiving and/or sending information to determine a location of the network entity 90 and/or the communications device 30. In an example configuration, the input\output portion 96 may comprise a GPS receiver. In an example configuration, the network entity 90 may determine its own geographical location and/or the geographical location of a communications device through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 96 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion may comprise a WIFI finder, a two way GPS chipset or equivalent, or the like, or a combination thereof.

The processing portion 92 may be capable of performing functions associated with management of timer settings and/or retry criteria/mechanisms as described herein. That is, a communications device can perform functions internally (by the device) and/or utilize the network entity 90 to perform functions. For example, the processing portion 92 may be capable of, in conjunction with any other portion of the network entity 90, installing an application for management of timer settings and/or retry criteria/mechanisms management of timer settings and/or retry criteria/mechanisms. The processing portion 92, in conjunction with any other portion of the network entity 90, enables the network entity 90 to covert speech to text when it is configured to also send text messages while utilizing the event based service.

In a basic configuration, the network entity 90 may include at least one memory portion 94. The memory portion 94 may comprise a storage medium having a tangible physical structure. Thus, the memory portion 94, as well as any computer-readable storage medium described herein, is not to be construed as a transient signal per se. The memory portion 94, as well as any computer-readable storage medium described herein, is not to be construed as a propagating signal per se. The memory portion 94 may store any information utilized in conjunction with management of timer settings and/or retry criteria/mechanisms as described herein. Depending upon the exact configuration and type of processor, the memory portion 94 may be volatile 98 (such as some types of RAM), non-volatile 100 (such as ROM, flash memory, etc.), or a combination thereof. The network entity 90 may include additional storage (e.g., removable storage 102 and/or non-removable storage 104) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the network entity 90.

The network entity 90 also may contain communications connection(s) 110 that allow the network entity 90 to communicate with other devices, network entities, or the like. A communications connection(s) can comprise communication media. Communication media typically embody computer readable instructions, data structures, program modules or other data in a modulated data signal such as a carrier wave or other transport mechanism and includes any information delivery media. By way of example, and not limitation, communication media include wired media such as a wired network or direct-wired connection, and wireless media such as acoustic, RF, infrared, and other wireless media. The term computer readable media as used herein includes both storage media and communication media. The network entity 90 also can include input device(s) 106 such as keyboard, mouse, pen, voice input device, touch input device, etc. Output device(s) 108 such as a display, speakers, printer, etc. also can be included.

A communications device and/or network entity may be part of and/or in communications with various wireless communications networks. Some of which are described below.

Figure 6:
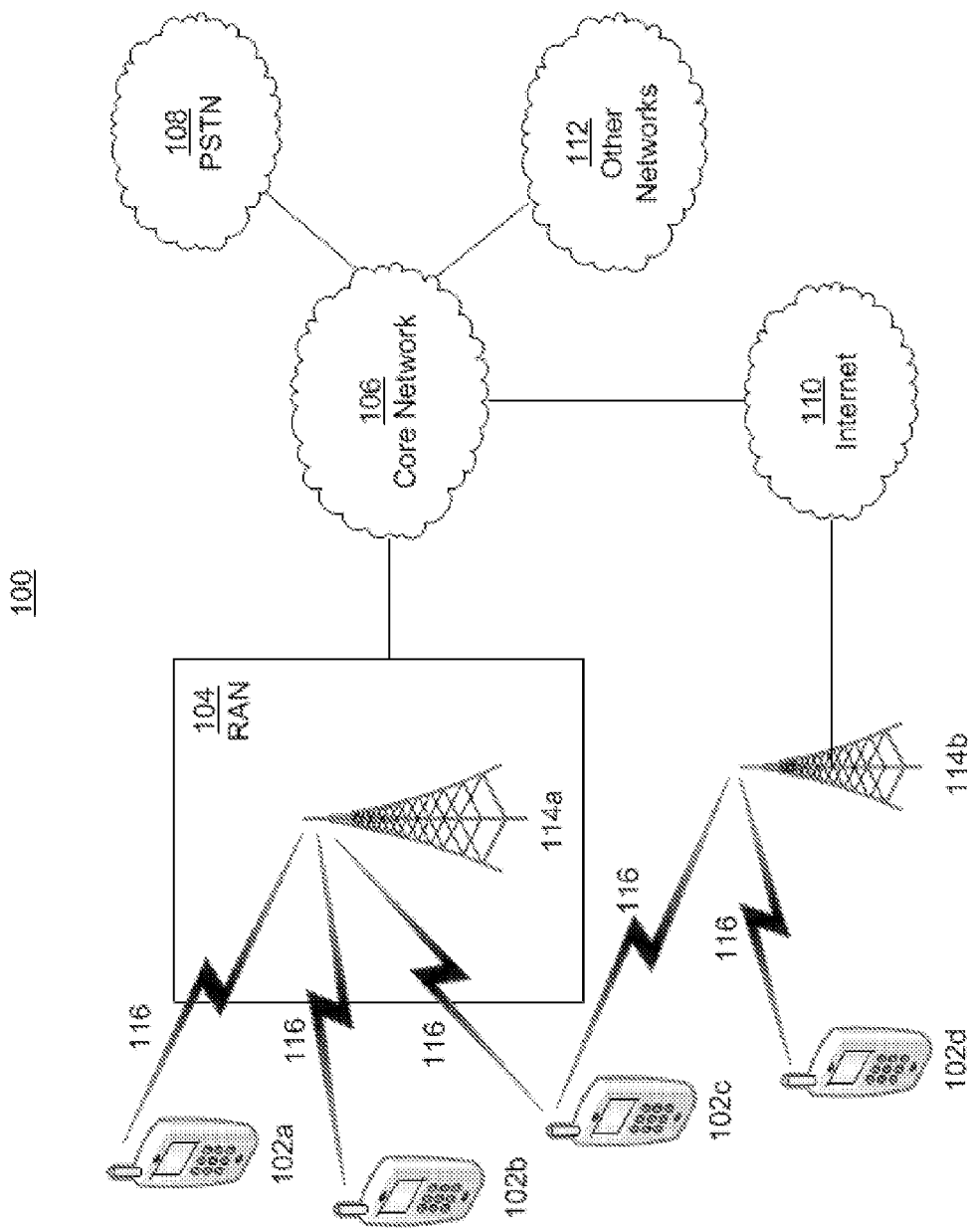
FIG. 6 is a diagram of an example communications system in which management of timer settings and/or retry criteria/mechanisms may be implemented.

FIG. 6 is a diagram of an example communications system in which management of timer settings and/or retry criteria/mechanisms may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 6 may also be referred to herein as a network.

As shown in FIG. 6, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. For example, a WTRU may comprise network entity 12, network entity 26, a UE, or the like, or any combination thereof. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 6 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 6, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 6, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 6 may be configured to communicate with the base station 114a, which may employ a cellular-based radio technology, and with the base station 114b, which may employ an IEEE 802 radio technology.

Figure 7:
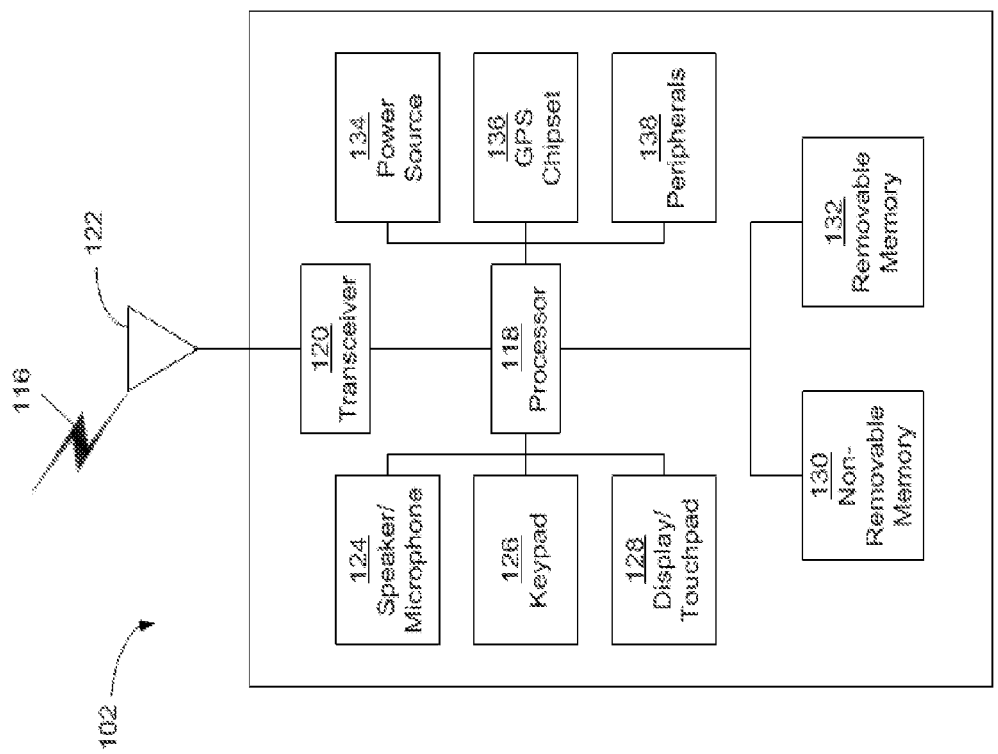
FIG. 7 is a system diagram of an example WTRU.

FIG. 7 is a system diagram of an example WTRU 102. As shown in FIG. 7, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 7 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 7 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8:
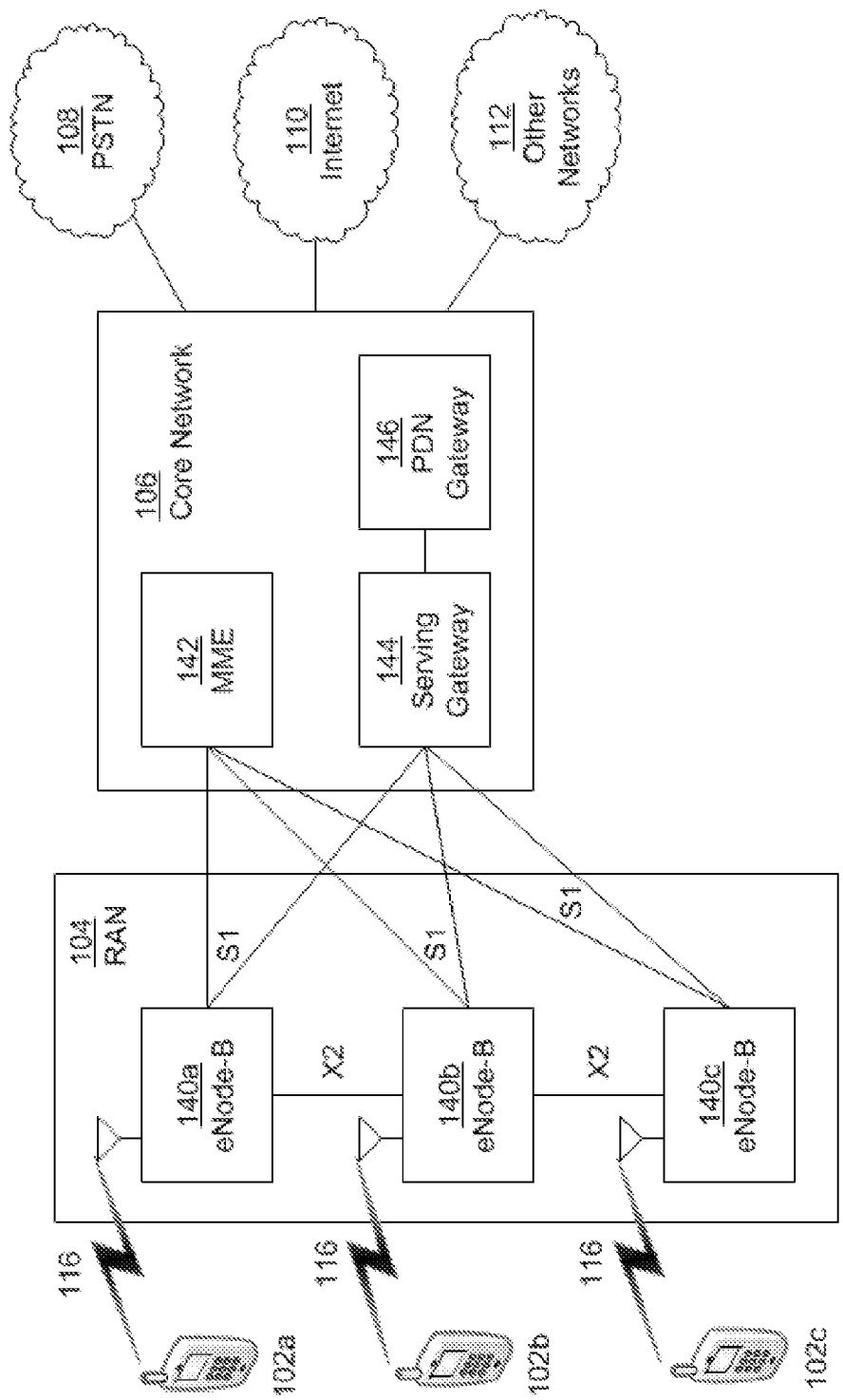
FIG. 8 is a system diagram of an example RAN and example core network.

FIG. 8 is an example system diagram of RAN 104 and core network 106. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and 140c may be associated with a particular cell (not shown) and may be configured to handle radio resource management decisions, handover decisions, scheduling of users in the uplink and/or downlink, and the like. As shown in FIG. 8, the eNode-Bs 140a, 140b, 140c may communicate with one another over an X2 interface.

The core network 106 shown in FIG. 8 may include a mobility management gateway or entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, and 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 9:
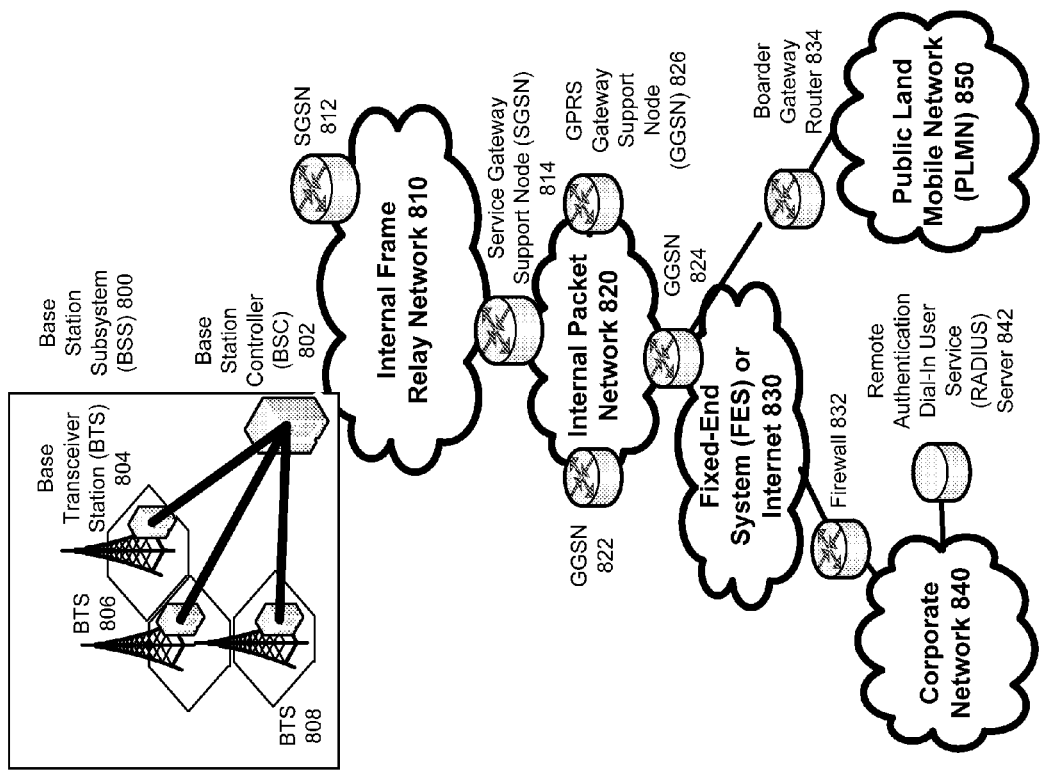
FIG. 9 depicts an overall block diagram of an example packet-based mobile cellular network environment, such as a GPRS network, within which management of timer settings and/or retry criteria/mechanisms may be implemented.

FIG. 9 depicts an overall block diagram of an example packet-based mobile cellular network environment, such as a GPRS network, within which management of timer settings and/or retry criteria/mechanisms may be implemented. In the example packet-based mobile cellular network environment shown in FIG. 9, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 10:
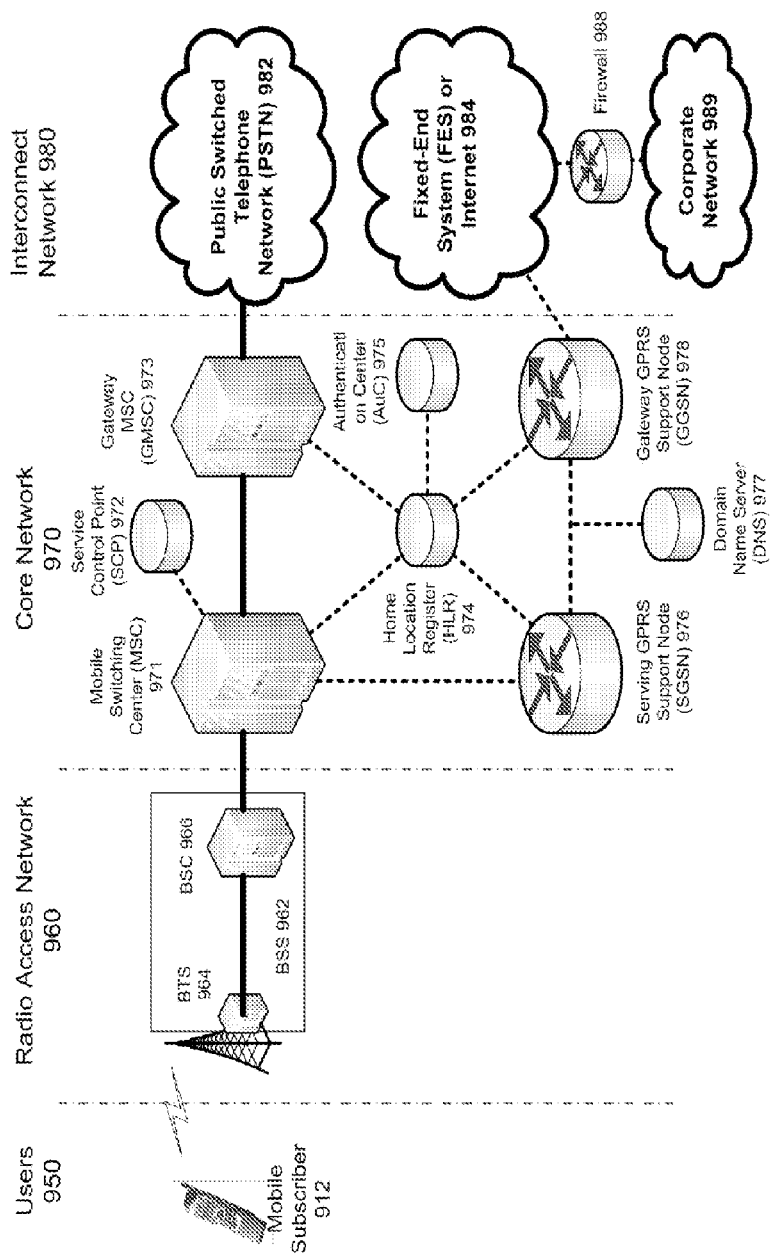
FIG. 10 illustrates an architecture of a typical GPRS network within which management of timer settings and/or retry criteria/mechanisms may be implemented.

FIG. 10 illustrates an architecture of a typical GPRS network within which management of timer settings and/or retry criteria/mechanisms may be implemented. The architecture depicted in FIG. 10 is segmented into four groups: users 950, radio access network 960, core network 970, and interconnect network 980. Users 950 comprise a plurality of end users. Note, device 912 is referred to as a mobile subscriber in the description of network shown in FIG. 10. In an example embodiment, the device depicted as mobile subscriber 912 comprises a communications device (e.g., communications device 160). Radio access network 960 comprises a plurality of base station subsystems such as BSSs 962, which include BTSs 964 and BSCs 966. Core network 970 comprises a host of various network elements. As illustrated in FIG. 10, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 10, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 10, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 11:
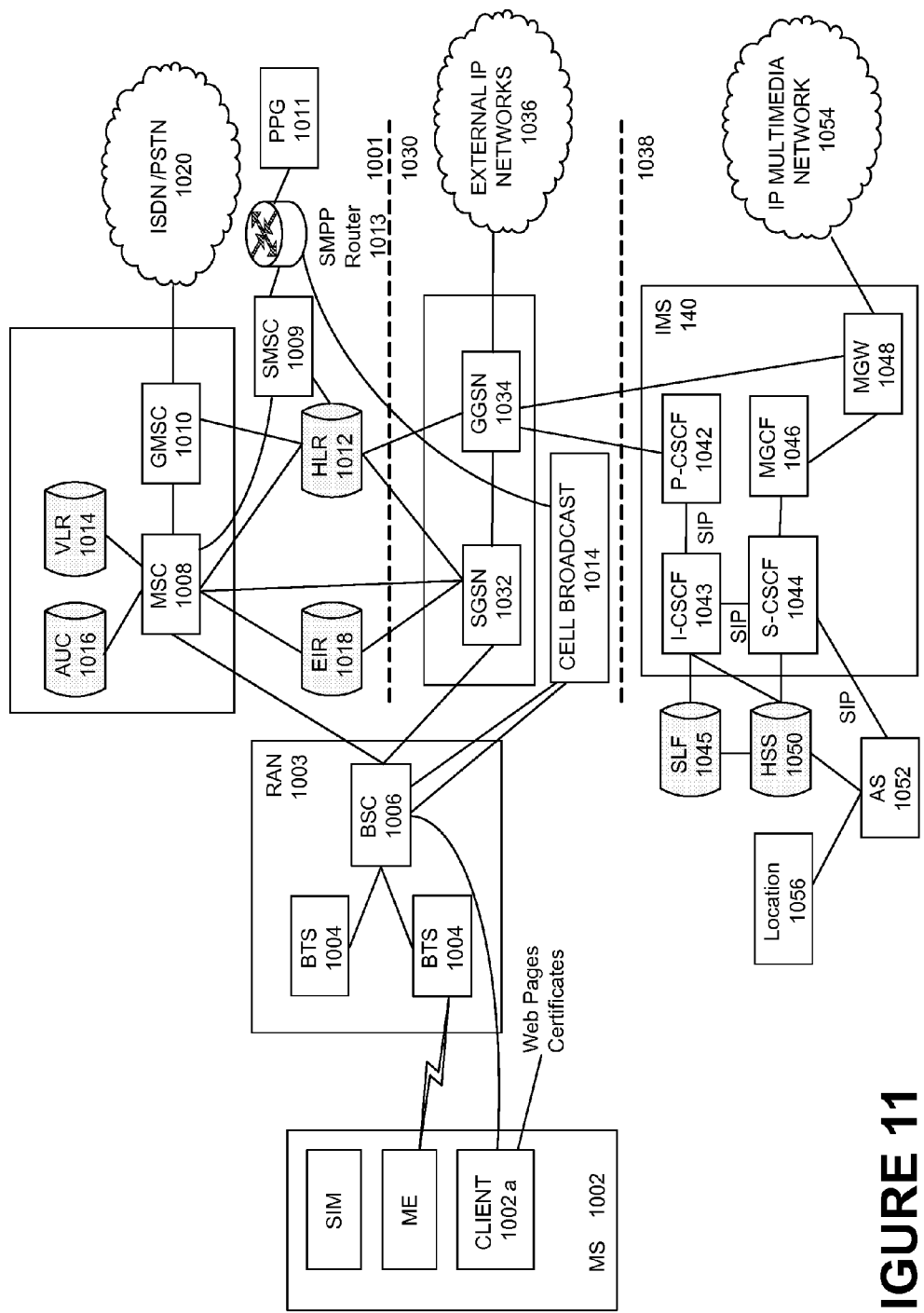
FIG. 11 illustrates an example block diagram view of a GSM/GPRS/IP multimedia network architecture within which management of timer settings and/or retry criteria/mechanisms may be implemented.

FIG. 11 illustrates an example block diagram view of a GSM/GPRS/IP multimedia network architecture within which management of timer settings and/or retry criteria/mechanisms may be implemented. As illustrated, the architecture of FIG. 11 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSCNLR, via the BTS 1004 and the BSC 1006. The location information is then sent to the MS's HLR. The HLR is updated with the location information received from the MSCNLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 12:
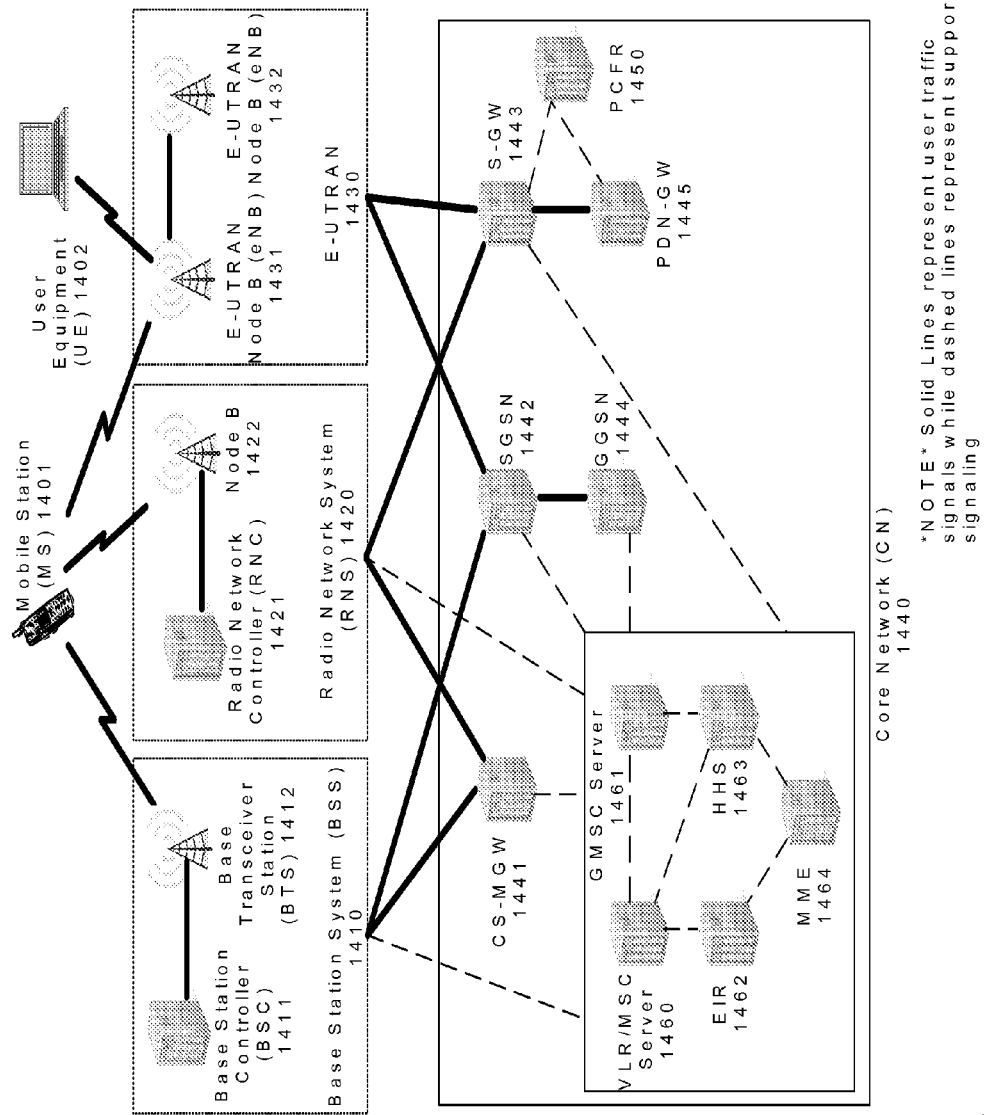
FIG. 12 illustrates a PLMN block diagram view of an example architecture in which management of timer settings and/or retry criteria/mechanisms may be incorporated.

FIG. 12 illustrates a PLMN block diagram view of an example architecture in which management of timer settings and/or retry criteria/mechanisms may be incorporated. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 12 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of management of timer settings and/or retry criteria/mechanisms have been described in connection with various computing devices/processors, the underlying concepts may be applied to any computing device, processor, or system capable of implementing management of timer settings and/or retry criteria/mechanisms. The various techniques described herein can be implemented in connection with hardware or software or, where appropriate, with a combination of both. Thus, the methods and apparatuses of using and implementing management of timer settings and/or retry criteria/mechanisms may be implemented, or certain aspects or portions thereof, can take the form of program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is not a transient signal per se. Further, a computer-readable storage medium is not a propagating signal per se. When the program code is loaded into and executed by a machine, such as a computer, the machine becomes an apparatus for implementing management of timer settings and/or retry criteria/mechanisms. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for using and implementing management of timer settings and/or retry criteria/mechanisms also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing management of timer settings and/or retry criteria/mechanisms. When implemented on a general-purpose processor, the program code combines with the processor to provide a unique apparatus that operates to invoke the functionality of management of timer settings and/or retry criteria/mechanisms.

While management of timer settings and/or retry criteria/mechanisms has been described in connection with the various embodiments of the various figures, it is to be understood that other similar embodiments can be used or modifications and additions can be made to the described embodiments for implementing management of timer settings and/or retry criteria/mechanisms without deviating therefrom. For example, one skilled in the art will recognize that management of timer settings and/or retry criteria/mechanisms as described in the present application may apply to any environment, whether wired or wireless, and may be applied to any number of such devices connected via a communications network and interacting across the network. Therefore, management of timer settings and/or retry criteria/mechanisms should not be limited to any single embodiment, but rather should be construed in breadth and scope in accordance with the appended claims.

What is claimed:

1. An apparatus comprising:
   a processor; and
   memory coupled to the processor, the memory comprising executable instructions that when executed by the processor cause the processor to effectuate operations comprising:
   attempting to establish communications with a first long term evolution network entity;
   when the attempt to establish communications with the first long term evolution network entity fails, waiting an amount of time equal to a value of a first timer associated with the first network entity before retrying an attempt to establish communications with the first long term evolution network entity;
   upon establishing communications with the first long term evolution network entity, subsequently attempting to establish communications with a second long term evolution network entity; and
   when the attempt to establish communications with the second long term evolution network fails, waiting an amount of time equal to a value of a second timer associated with the second long term evolution network entity before retrying an attempt to establish communications with the second long term evolution network entity.

2. The apparatus of claim 1, wherein at least one of:
   the value of the first timer is based on an amount of data traffic on a long term evolution network; or
   the value of the second timer is based on an amount of data traffic on the long term evolution network.

3. The apparatus of claim 1, wherein:
   a maximum number of times to retry establishing communications with the first long term evolution network entity is greater than a maximum number of times to retry establishing communications with the second long term evolution network entity.

4. The apparatus of claim 1, wherein at least one of:
   a maximum number of times to retry establishing communications with the first long term evolution network entity is based on an amount of data traffic on a long term evolution network; or
   a maximum number of times to retry establishing communications with the second long term evolution network entity is based on an amount of data traffic on the long term evolution network.

5. The apparatus of claim 1, the operations further comprising:
   receiving, from at least one of the first long term evolution network entity or the second long term evolution network entity, an indication of an amount of data traffic on a long term evolution network.

6. The apparatus of claim 1, the operations further comprising:
   determining the value of the second timer.

7. The apparatus of claim 1, the operations further comprising:
   determining a maximum number of times to retry establishing communications with the second long term evolution network entity.

8. A method comprising:
   attempting to establish communications with a first long term evolution network entity;
   when the attempt to establish communications with the first long term evolution network entity fails, waiting an amount of time equal to a value of a first timer associated with the first network entity before retrying an attempt to establish communications with the first long term evolution network entity;

upon establishing communications with the first long term evolution network entity, subsequently attempting to establish communications with a second long term evolution network entity; and when the attempt to establish communications with the second long term evolution network fails, waiting an amount of time equal to a value of a second timer associated with the second long term evolution network entity before retrying an attempt to establish communications with the second long term evolution network entity.

9. The method of claim 8, wherein at least one of:

the value of the first timer is based on an amount of data traffic on a long term evolution network; or the value of the second timer is based on an amount of data traffic on the long term evolution network.

10. The method of claim 8, wherein:

a maximum number of times to retry establishing communications with the first long term evolution network entity is greater than a maximum number of times to retry establishing communications with the second long term evolution network entity.

11. The method of claim 8, wherein at least one of:

a maximum number of times to retry establishing communications with the first long term evolution network entity is based on an amount of data traffic on a long term evolution network; or a maximum number of times to retry establishing communications with the second long term evolution network entity is based on an amount of data traffic on the long term evolution network.

12. The method of claim 8, further comprising:

receiving, from at least one of the first long term evolution network entity or the second long term evolution network entity, an indication of an amount of data traffic on a long term evolution network.

13. The method of claim 8, further comprising:

determining the value of the second timer.

14. The method of claim 8, further comprising:

determining a maximum number of times to retry establishing communications with the second long term evolution network entity.

15. A non-transitory computer-readable storage medium comprising executable instructions that when executed by a processor cause the processor to effectuate operations comprising: attempting to establish communications with a first long term evolution network entity; when the attempt to establish communications with the first long term evolution network entity fails, waiting an amount of time equal to a value of a first associated with the first network entity before retrying an attempt to establish communications with the first long term evolution network entity; upon establishing communications with the first long term evolution network entity, subsequently attempting to establish communications with a second long term evolution network entity; and when the attempt to establish communications with the second long term evolution network fails, waiting an amount of time equal to a value of a second associated with the second long term evolution network entity before retrying an attempt to establish communications with the second long term evolution network entity.

16. The non-transitory computer-readable storage medium of claim 15, wherein at least one of: the value of the first is based on an amount of data traffic on a long term evolution network; or the value of the second is based on an amount of data traffic on the long term evolution network.

17. The non-transitory computer-readable storage medium of claim 15, wherein: a maximum number of times to retry establishing communications with the first long term evolution network entity is greater than a maximum number of times to retry establishing communications with the second long term evolution network entity.

18. The non-transitory computer-readable storage medium of claim 15, wherein at least one of: a maximum number of times to retry establishing communications with the first long term evolution network entity is based on an amount of data traffic on a long term evolution network; or a maximum number of times to retry establishing communications with the second long term evolution network entity is based on an amount of data traffic on the long term evolution network.

19. The non-transitory computer-readable storage medium of claim 15, the operations further comprising: receiving, from at least one of the first long term evolution network entity or the second long term evolution network entity, an indication of an amount of data traffic on a long term evolution network.

20. The non-transitory computer-readable storage medium of claim 15, the operations further comprising: determining the value of the second timer.

* * * * *